United States Patent
Taccari et al.

(10) Patent No.: US 12,406,458 B2
(45) Date of Patent: Sep. 2, 2025

(54) SYSTEMS AND METHODS FOR DETECTING A DRIVING AREA IN A VIDEO

(71) Applicant: Verizon Patent and Licensing Inc., Basking Ridge, NJ (US)

(72) Inventors: Leonardo Taccari, Florence (IT); Francesco Sambo, Florence (IT); Douglas Coimbra De Andrade, Florence (IT)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 331 days.

(21) Appl. No.: 18/156,604

(22) Filed: Jan. 19, 2023

(65) Prior Publication Data
US 2024/0249493 A1 Jul. 25, 2024

(51) Int. Cl.
*G06V 10/22* (2022.01)
*G06V 10/764* (2022.01)
*G06V 20/40* (2022.01)
*G06V 20/56* (2022.01)
*G06V 20/58* (2022.01)

(52) U.S. Cl.
CPC .......... *G06V 10/225* (2022.01); *G06V 10/764* (2022.01); *G06V 20/41* (2022.01); *G06V 20/58* (2022.01); *G06V 20/588* (2022.01); *G06V 2201/08* (2022.01)

(58) Field of Classification Search
CPC ...... G06V 10/225; G06V 20/58; G06V 20/41; G06V 10/764; G06V 20/588; G06V 2201/08
See application file for complete search history.

(56) References Cited

U.S. PATENT DOCUMENTS

| 10,345,449 B2 | 7/2019 | Salti et al. | |
|---|---|---|---|
| 2010/0021011 A1* | 1/2010 | Shida | G08G 1/22 |
| | | | 382/104 |
| 2015/0039202 A1* | 2/2015 | Kido | G06V 20/584 |
| | | | 701/93 |
| 2020/0116518 A1* | 4/2020 | Lee | G06F 3/013 |
| 2020/0180656 A1* | 6/2020 | Kim | B60W 30/0956 |
| 2020/0218277 A1* | 7/2020 | Cunningham | G07C 5/0808 |
| 2021/0089791 A1* | 3/2021 | Sithiravel | G01S 7/4802 |
| 2023/0100507 A1* | 3/2023 | Kim | B60W 10/20 |
| | | | 382/103 |
| 2024/0153281 A1* | 5/2024 | Zhou | G06V 20/588 |

* cited by examiner

*Primary Examiner* — David Perlman (57) ABSTRACT

In some implementations, a video system may capture, from a camera mounted to a vehicle, a video of a portion of a road on which the vehicle is traveling. The video system may detect, in the video, a driving lane associated with the road on which the vehicle is traveling. The video system may detect, in the video, multiple other vehicles within the driving lane. The video system may determine, for each of the multiple other vehicles within the driving lane, a bounding box that substantially surrounds an image of the other vehicle, resulting in a plurality of bounding boxes. The video system may determine a region in the video corresponding to an area to be driven by the vehicle based on the plurality of bounding boxes.

20 Claims, 9 Drawing Sheets

SYSTEMS AND METHODS FOR DETECTING A DRIVING AREA IN A VIDEO

BACKGROUND

A dashcam is an onboard camera that continuously records images and/or video through a vehicle's front windshield or rear window. A vehicle may also include one or more integrated cameras that continuously record images and/or video associated with surroundings of the vehicle. Some dashcams and/or integrated cameras can send the images and/or video to another device wirelessly. In addition, some dashcams and/or integrated cameras gather various metrics related to a vehicle with which the dashcams and/or integrated cameras are associated, such as acceleration, deceleration, speed, steering angle, global navigation satellite system (GNSS) data (e.g., global positioning system (GPS) data), and/or the like.

DETAILED DESCRIPTION OF EXAMPLE EMBODIMENTS

The following detailed description of example implementations refers to the accompanying drawings. The same reference numbers in different drawings may identify the same or similar elements.

A vehicle dashcam or a similar type of camera may be installed on a vehicle and used to record images and/or video of an environment of the vehicle. For example, the dashcam or similar type of camera may record images and/or video continuously while the vehicle is being operated (e.g., from a time that a user of the vehicle starts an engine of the vehicle until the engine is stopped, when vehicle motion is detected, or the like). The images and/or video may be used to assess a cause of an accident involving the vehicle, to record driving behavior of an operator of the vehicle or operators of other vehicles, or for similar purposes.

In some instances, the images and/or video captured by a dashcam or a similar type of camera mounted on a vehicle (which is sometimes referred to as an ego vehicle, because the vehicle may be associated with an egocentric coordinate system associated with one or more vehicle systems that is anchored and/or centered at the vehicle) may be used in connection with an advanced driving assistance system (ADAS), an autonomous driving system, a video fleet management system, a vehicle safety system, a lane departure warning system, or a similar system. In such cases, various applications may require an estimation of a region in an image obtained from the camera that corresponds to an area to be driven by the ego vehicle. In some cases, this region may be a substantially triangular region extending from a bottom portion of an image and/or a representation of a hood of the ego vehicle in the image to a vanishing point on or near a horizon. Due to the triangular shape of the region in the image that corresponds to the area to be driven by the ego vehicle, the region is sometimes be referred to as a "cone," such as a "driving cone" and/or a "cone of impact."

In some examples, estimating the driving cone may represent a fundamental calibration step for several applications. For example, in lane departure warning applications, a system may alert a driver of the ego vehicle if the ego vehicle is crossing a solid or dashed line (e.g., a lane line) so that the driver can correct their course. Such applications may rely on an estimation of the driving cone, because the application may alert the driver when a lane line enters the driving cone in the image or otherwise approaches the driving cone in the image. As another example, in a headway monitoring warning application (sometimes referred to as a tailgating detection application and/or a frontal collision warning application), a system may alert the driver of the ego vehicle when the ego vehicle becomes dangerously close to a vehicle in front of the ego vehicle. Such applications may similarly rely on an estimation of the driving cone, because the application may alert the driver when a relatively close vehicle is within the driving cone, indicating that a collision could be imminent.

Estimating and/or calibrating a driving cone has proven challenging because dashcams or similar types of cameras may be employed in a wide variety of vehicle classes and/or may be installed in a variety of locations within vehicles. Put another way, estimating a driving cone associated with a particular camera prior to installation may be difficult due to intrinsic variations (e.g., variations of a focal length of the camera, a field of view (FOV) associated with the camera, distortion caused by the specific installation of the camera, or similar variations), extrinsic variations (e.g., a position of the camera, an orientation of the camera, or similar variations), and/or vehicle variations (e.g., a width of the vehicle, or similar variations). For example, both intrinsic and extrinsic parameters of the camera may determine how the width of the ego vehicle translates to pixel coordinates in an image, a mounting position of the camera may change significantly from vehicle to vehicle, and/or a vehicle height may differ significantly among various classes of vehicles, which all affect the driving cone for the particular installation. Accordingly, accurately estimating a driving cone of a vehicle may be limited, resulting in error prone ADASs, autonomous driving systems, video fleet management systems, vehicle safety systems, lane departure warning systems, or similar systems, and/or high power, computing, and communication resource consumption associated with calibrating video systems and/or identifying and correcting errors associated with video systems.

Some implementations described herein enable an automatic calibration of a camera mounted to a vehicle (e.g., a dashcam or a similar camera), such as for purposes of providing improved ADAS applications, improved autonomous driving applications, improved video fleet management applications, improved vehicle safety applications, improved lane departure warning applications, or other improved applications. In some implementations, a video system may determine a driving cone using various vehicles detected within an image, such as a video frame of a video captured by a dashcam or a similar type of camera. For example, the video system may detect a driving lane associated with a road in the video frame and multiple vehicles traveling within the driving lane over time, such as by using object recognition and classification techniques. The video system may detect multiple vehicles associated with a same vehicle class, determine bounding boxes associated with the multiple vehicles, and determine a region in the video corresponding to an area to be driven by the vehicle based on the bounding boxes. For example, the video system may determine boundaries of the driving cone by using a linear fit model to determine a first line that fits to lower-left corners of the bounding boxes and a second line that fits to lower-right corners of the bounding boxes. Additionally, or alternatively, the video system may determine a driving cone based on driving lanes detected in a video frame in combination with certain parameters about the road and/or the ego vehicle, such as a width of a driving lane and/or a width of the ego vehicle. For example, based on determining a ratio of the width of the ego vehicle to the width of the driving lane, the video system may estimate the driving cone as corresponding to a certain percentage of the width of the detected driving lane. As a result, an accuracy of estimating a driving cone of a vehicle may be improved, resulting in more robust ADASs, autonomous driving systems, video fleet management systems, vehicle safety systems, lane departure warning systems, or similar systems, and/or reduced power, computing, and communication resource consumption that would otherwise be required to calibrate video systems and/or identify and correct errors associated with various camera-based safety systems.

Figure 1A:
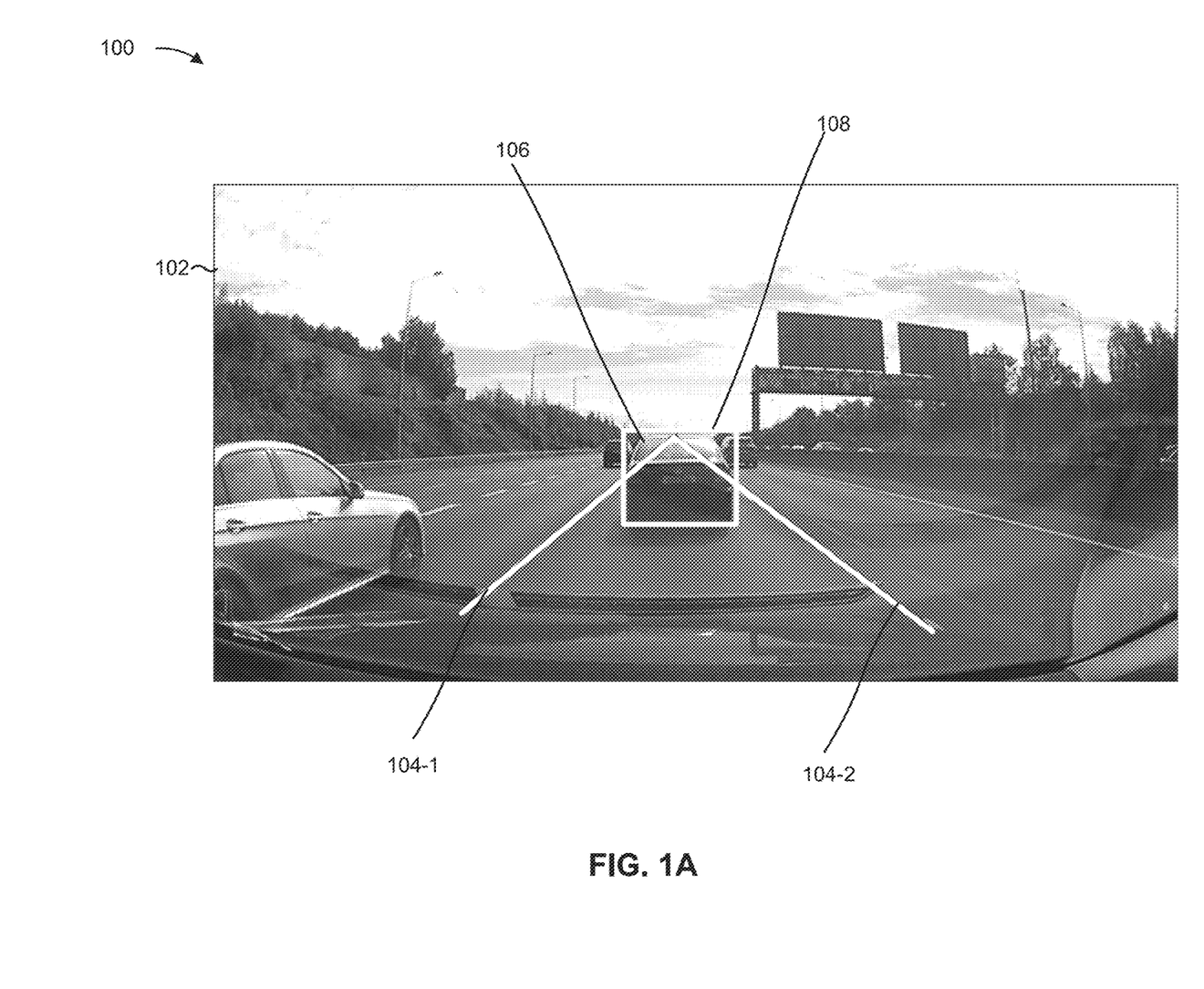
FIGS. 1A-1C are diagrams of an example associated with detecting a driving area in a video.
Figure 1B:
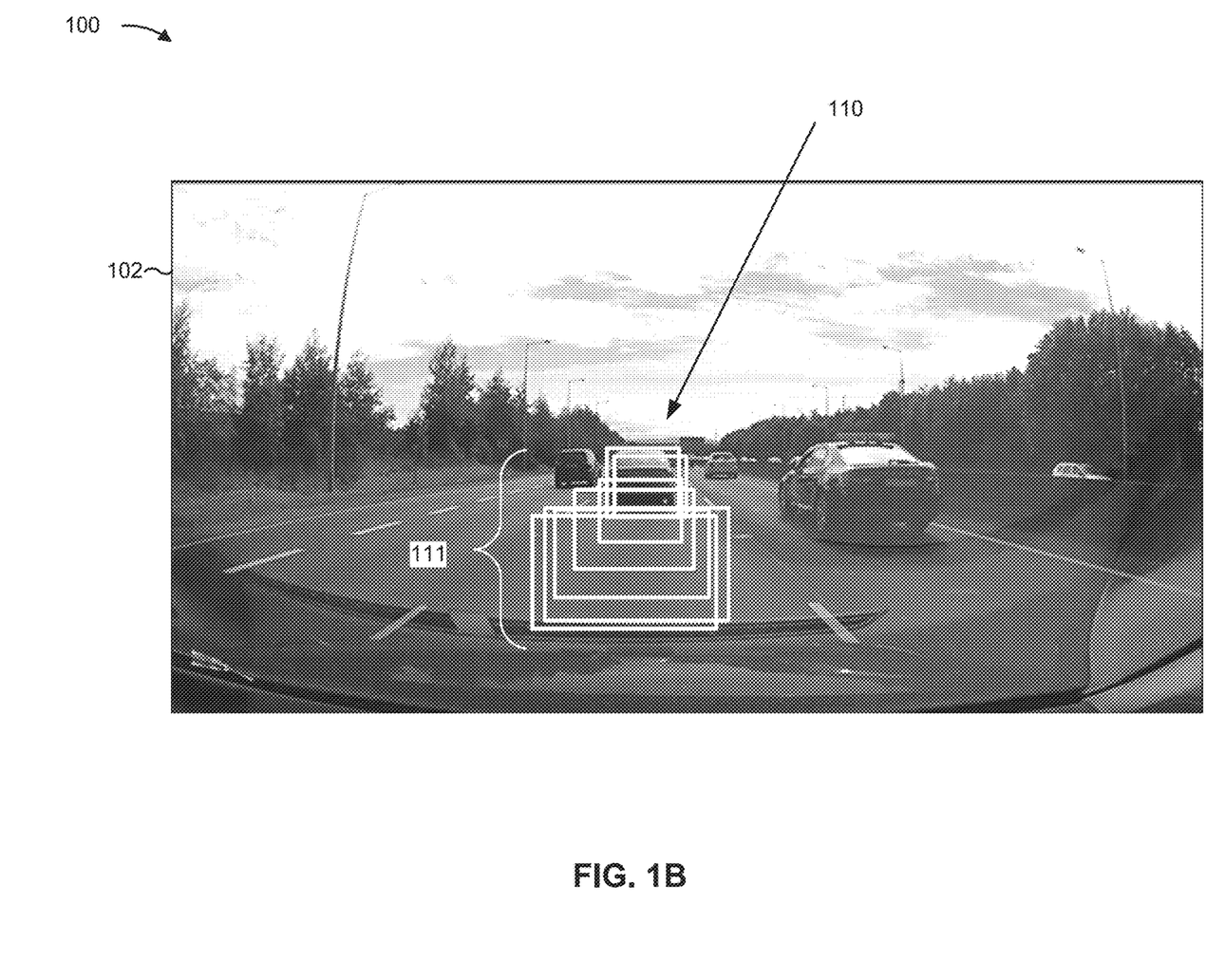
Figure 1C:
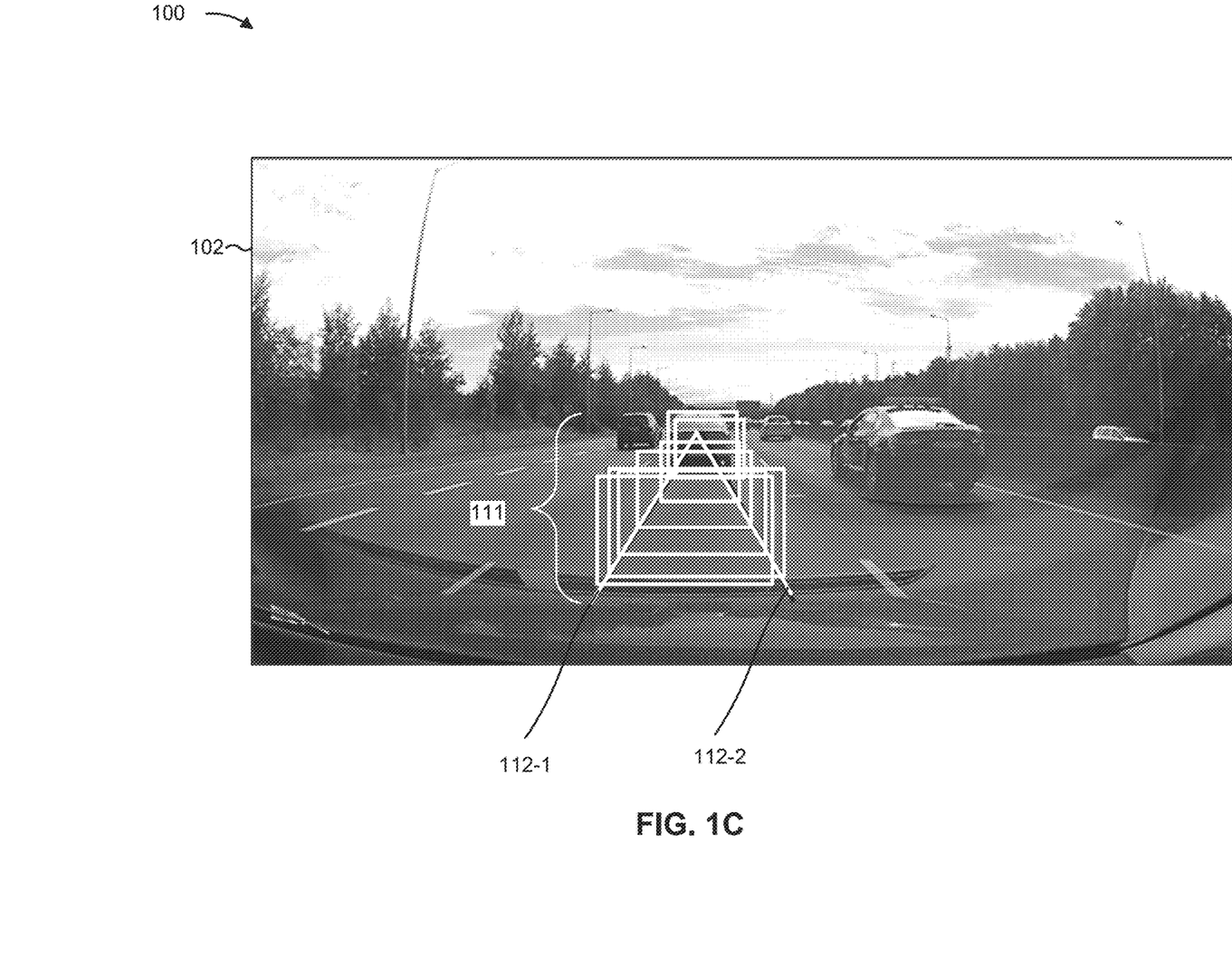

FIGS. 1A-1C are diagrams of an example 100 associated with detecting a driving area in a video. The example 100 may be associated with a method performed by a video system, such as a video system including or associated with one or more devices described below in connection with FIGS. 3-4.

FIG. 1A shows an example video frame 102, such as a video frame from a video captured by a dashcam or a similar type of camera mounted to a dashboard of a vehicle (e.g., the ego vehicle) or otherwise integrated into the vehicle. The video frame 102 may generally include a representation of the horizon and/or a vanishing point (e.g., a portion at which a roadway appears to vanish) with the sky and/or other objects shown extending above the horizon and/or the vanishing point, and a portion of a road on which the ego vehicle is traveling shown below the horizon and/or the vanishing point. In some implementations, the road may appear as if it is converging to a single point on or near the horizon (e.g., the vanishing point). Moreover, the video frame 102 may include representations of other environmental features of the ego vehicle, such as representations of other vehicles traveling on the road, one or more markings on the road (e.g., lane lines, such as solid lines marking edges of a drivable surface of the road and/or a driving lane, dashed lines marking edges of the driving lane, or similar markings), among other features. In some implementations, the dashcam or similar type of camera may be configured to capture multiple video frames 102 over time, thereby forming a video (more particularly, a video file, such as a moving picture experts group (MPEG) file or a similar video file) of the road on which the vehicle is traveling. More particularly, the dashcam or similar type of camera may be configured to capture video frames multiple times per second according to a predetermined rate (sometimes referred to as a video frame rate, which may be defined in terms of frames per second (FPS)), with the video comprising each of the captured frames recorded in succession.

In some implementations, the video system may be configured to detect, in the video and/or the video frame, a driving lane associated with the road on which the ego vehicle is traveling. More particularly, the video system may be configured to detect two lane lines 104, including a left lane line 104-1 and a right lane line 104-2 bounding the driving lane. In some implementations, the video system may use a lane detection algorithm in order to detect the driving lane associated with the road on which the ego vehicle is traveling. For example, the video system may implement a traditional computer vision algorithm, an edge detection operator, a feature extraction technique, or a similar process to detect the lane lines 104 in the video frame 102. For example, the video system may use one or more of a Canny edge detector, a Hough transform, or a similar technique to recognize the lane lines 104 in the video frame 102. Additionally, or alternatively, detecting the driving lane may be performed by the video system implementing a machine learning and/or a deep learning based approach to identify the lane lines 104 in the video frame 102. For example, the video system may use one or more of a cross layer refinement network (CLRNet) technique, a conditional lane network (CondLaneNet) technique, or a similar technique to identify the lane lines 104 in the video frame 102. In some other implementations, detecting the driving lane may be performed using an object detection technique, such as one or more of the object detection techniques described in more detail below in connection with detecting other vehicles in the video frame.

In some implementations, the video system may be configured to detect, in the video frame 102, one or more other vehicles within the driving lane. For example, in the implementation shown in FIG. 1A, the video system may detect that a vehicle 106 is within the driving lane (e.g., is within the region of the video frame bounded by the left lane line 104-1 and the right lane line 104-2). In some implementations, detecting the one or more other vehicles within the driving lane may be performed using machine learning and/or via one or more object detection techniques. For example, in some implementations, detecting a vehicle within the driving lane may be performed using at least one of a deep learning model and/or by using a You Only Look Once (YOLO) object detection technique, a Faster Region-based Convolution Neural Network (Faster R-CNN) object detection technique, an Efficient Detection (EfficientDet) object detection technique, or a similar object detection technique.

In some implementations, as part of the object detection process or in addition to the object detection process, the video system may determine a bounding box 108 associated with the detected vehicle 106. The bounding box 108 may be a rectangular shape that substantially surrounds a detected object (e.g., the detected vehicle 106 in the example shown in FIG. 1A) and/or that is used to describe the spatial location of a detected object in an image. In some implementations, the bounding box 108 may generally span in a horizontal direction (e.g., an x-axis direction) a detected width of the vehicle 106 and/or the bounding box 108 may generally span in a vertical direction (e.g., a y-axis direction) a detected height of the vehicle 106. In some implementations, the bounding box 108 may be defined by the video system according to x and y coordinates of one or more portions of the bounding box. For example, the bounding box 108 may be defined according to x and y coordinates of the upper-left corner of the rectangle forming the bounding box 108 and x and y coordinates of the lower-right corner of the rectangle forming the bounding box 108. In some other implementations, the video system may define the bounding box 108 according to x and y coordinates of a center of the bounding box 108, a width of the bounding box (e.g., an x-axis dimension of the bounding box), and a height of the bounding box 108 (e.g., a y-axis dimension of the bounding box). Accordingly, in some implementations, the video system may determine the bounding box 108 associated with the detected vehicle 106 by determining x and y coordinates associated with a rectangle that substantially surrounds the detected vehicle 106 in the video frame 102. In some implementations, the detected vehicle 106 may be determined to be within the driving lane when x and y coordinates of the lower-left corner of the bounding box 108 and the lower-right corner of the bounding box 108 are within the driving lane (e.g., are between the left lane line 104-1 and the right lane line 104-2), as shown in FIG. 1A.

As shown in FIG. 1B, and as indicated by reference number 110, in some implementations, the video system may repeat a similar object detection process using multiple images (e.g., multiple video frames 102) over time, in the same or different videos, in order to determine multiple bounding boxes. Put another way, the video system may determine, for each of multiple instances of a detected vehicle within the driving lane, a bounding box that substantially surrounds the detected vehicle, resulting in a plurality of bounding boxes 111. Moreover, as is described in more detail below in connection with FIG. 1C, the video system may determine a driving cone based on connecting coordinates of the multiple bounding boxes (e.g., the plurality of bounding boxes 111) using a linear fit model or a similar method. Accordingly, in some implementations, the plurality of bounding boxes 111 may be associated with vehicles that are associated with a same vehicle class in order to improve the linear fit model. This is because a width of vehicles belonging to a same vehicle class may not significantly vary, and thus bounding boxes associated with vehicles of the same vehicle class may be considered to be associated with substantially similarly sized vehicles. Accordingly, by using multiple bounding boxes associated with a same vehicle class, an accuracy and/or reliability of the driving cone determination techniques described herein may be improved. For example, in the example depicted in FIGS. 1A and 1B, each of the detected vehicles used to determine the plurality of bounding boxes 111 may be associated with a passenger car class.

In some aspects, the video system may determine a class of a detected vehicle, such as by using one or more of the object detection and classification models described above (using, e.g., deep learning), and thus segment bounding boxes associated with the various classes, accordingly. For example, upon detecting that a vehicle is within the driving lane (e.g., between the left lane line 104-1 and the right lane line 104-2), the video system may detect a class of the detected vehicle and associate a corresponding bounding box with bounding boxes from other vehicles belonging to the same class. In this regard, the video system may be configured to form multiple sets of bounding boxes, such as a first set of bounding boxes associated with passenger cars, a second set of bounding boxes associated with vans, a third set of bounding boxes associated with trucks, and so forth, and the video system may continue to collect and/or segment bounding boxes until the video system has collected a threshold of bounding boxes (e.g., 50 or more, as described below) in any one class to estimate the driving cone. Thus, in the example shown in FIG. 1B, each of the depicted bounding boxes, which may correspond to multiple detected vehicles within the driving lane, may be associated with a same class of vehicles.

In some aspects, a threshold number (sometimes referred to as N) of bounding boxes may be collected in order to determine a driving cone associated with the ego vehicle. Collecting the threshold number of bounding boxes may ensure a robust linear fit model or similar technique used to estimate the driving cone of the ego vehicle. For example, in some implementations, at least 50 bounding boxes (e.g., $N \geq 50$) may be collected in order to estimate the driving cone associated with the ego vehicle. Additionally, or alternatively, bounding boxes may be collected by the video system for a predetermined amount of time. For example, the video system may be configured to collect the samples for a predetermined time after installation (e.g., for one hour following an initial installation of a camera) in order to calibrate the driving cone in the ego vehicle.

As shown in FIG. 1C, the video system may determine a region in the video corresponding to an area to be driven by the ego vehicle based on the plurality of bounding boxes 111. Put another way, the video system may determine the driving cone associated with the ego vehicle based on the plurality of bounding boxes 111. In some implementations, this may include using a linear fit model to determine lines 112 that fit to one or more coordinates associated with each of the plurality of bounding boxes 111. For example, the video system may use a linear fit model to determine a first line 112-1 that fits robustly to lower-left corners of the plurality of bounding boxes 111 (e.g., that fits to the x and y coordinates of the lower-left corners of the bounding boxes) and a second line 112-2 that fits robustly to lower-right corners of the plurality of bounding boxes 111 (e.g., that fits to the x and y coordinates of the lower-right corners of the bounding boxes). As used herein, "fitting" a line to coordinates refers to using a model to determine a line that best approximates a linear relationship between the various data points, such as, in the above example, using a model to determine the first line 112-1 that best approximates a linear relationship between the coordinates of the lower-left corners of the plurality of bounding boxes 111, and to determine the second line 112-2 that best approximates a linear relationship between the coordinates of the lower-right corners of the plurality of bounding boxes 111. In some implementations, the video system may implement a linear fit model that is robust to outliers in order to determine the first line 112-1 and the second line 112-2, such as a Random Sample Consensus (RANSAC) method or a similar method.

As shown in FIG. 1C, the plurality of bounding boxes 111 may correspond to detected vehicles at various distances from the ego vehicle, and thus the plurality of bounding boxes 111 may be of various sizes (e.g., bounding boxes associated with detected vehicles that are close to the ego vehicle may be relatively large, and bounding boxes associated with detected vehicles that are far from the ego vehicle may be relatively small). Accordingly, determining the first line 112-1 that fits robustly to lower-left corners of the plurality of bounding boxes and the second line 112-2 that fits robustly to lower-right corners of the plurality of bounding boxes may result in two converging lines originating from a portion of the video frame 102 including a representation of a hood of the ego vehicle and/or near a bottom of the video frame 102 and intersecting at a point near the horizon (e.g., at or near the vanishing point). The area bounded by these two intersecting lines 112-1, 112-2 maybe determined to be the driving cone (e.g., the region in the video corresponding to the area to be driven by the ego vehicle, which may be an area common to a sequence of frames).

In some implementations, determining the driving cone may be further based on determining a class of the ego vehicle. For example, in implementations in which the ego vehicle is a different class of vehicle than the detected vehicles associated with the plurality of bounding boxes 111, the area between the first line 112-1 and the second line 112-2 maybe enlarged or narrowed, accordingly. For example, in implementations in which the ego vehicle belongs to a class of vehicles that is wider than the class of vehicles used to determine the area shown in FIG. 1C, the area may be widened in order to compensate for the greater width of the ego vehicle. For example, the area may be widened proportionally to a ratio of an average width of the class of vehicles associated with the ego vehicle to an average width of the class of vehicles associated with the detected vehicles associated with the plurality of bounding boxes 111. Similarly, in implementations in which the ego vehicle belongs to a class of vehicles that is narrower than the class of vehicles used to determine the area shown in FIG. 1C, the area may be narrowed in order to compensate for the narrower stature of the ego vehicle. For example, the area may be narrowed proportionally to a ratio of an average width of the class of vehicles associated with the ego vehicle to an average width of the class of vehicles associated with the detected vehicles associated with the plurality of bounding boxes 111.

In some implementations, the video system may be configured with the class of vehicle of the ego vehicle, such as via user input or the like following installation of the dashcam or similar type of camera. In some other implementations, the video system may determine a class of the ego vehicle. For example, the video system may determine that the camera is mounted on and/or in one of a motorcycle, a passenger car, a passenger van, a passenger truck, a crossover vehicle, a sport utility vehicle (SUV), a commercial truck, a mini bus, a bus, a tractor trailer, or a similar class of vehicle. In some implementations, the video system may be provided with an identifier associated with the ego vehicle, and/or the video system may determine the class of vehicle associated with the ego vehicle based on the identifier associated with the ego vehicle. For example, the video system may be provided with an indication of a vehicle identification number (VIN) associated with the ego vehicle, and thus determine the class of the vehicle associated with the ego vehicle based on the VIN.

In some other implementations, the video system may determine the class of vehicle of the ego vehicle based on other information or data, such as based on sensor data associated with the ego vehicle. For example, the video system may include and/or be associated with a vehicle classification system, which may be configured to determine a class of a vehicle based on on-board sensor data, such as global navigation satellite system (GNSS) data (e.g., global positioning satellite (GPS) data) or similar data. In some implementations, the video system and/or vehicle classification system may be configured to determine a class of vehicle associated with an ego vehicle based on one or more machine learning techniques. For example, the video system and/or vehicle classification system may be configured to determine a class of vehicle associated with an ego vehicle by utilizing a recurrent neural network (RNN) technique to process a set of vectors associated with GNSS data and thereby determine the class of vehicle.

In some implementations, the estimated driving cone may be an ideal area occupied by the ego vehicle when the ego vehicle is driving straight (e.g., not turning). In implementations in which the ego vehicle is turning, such as during the vehicle detection phase and/or bounding box determined phase described above in connection with FIGS. 1A-1B, the captured data may need to be adjusted to compensate for the turn of the ego vehicle and/or the detected vehicles. In such implementations, the video system may determine an angular speed of the vehicle, and thus determining the region in the video corresponding to the area to be driven by the ego vehicle (e.g., determining the driving cone) may be further based on the angular speed of the vehicle. In some implementations, the video system may determine an angular speed of the ego vehicle from a gyroscopic sensor or similar on-board sensor.

In some implementations, the video system may be associated with an artificial intelligence (AI) controlled dashcam or similar type of camera that is capable of performing object detection on all video frames (e.g., video frames 102) for other purposes (e.g., purposes other than the driving cone detection process described above). Accordingly, the implementations described above in connection with FIGS. 1A-1C may be implemented in the video system with little hardware and/or software change, such as by providing marginal additional computation to compute the linear fit described above in connection with FIG. 1C.

As indicated above, FIGS. 1A-1C are provided as an example. Other examples may differ from what is described with regard to FIGS. 1A-1C.

Figure 2A:
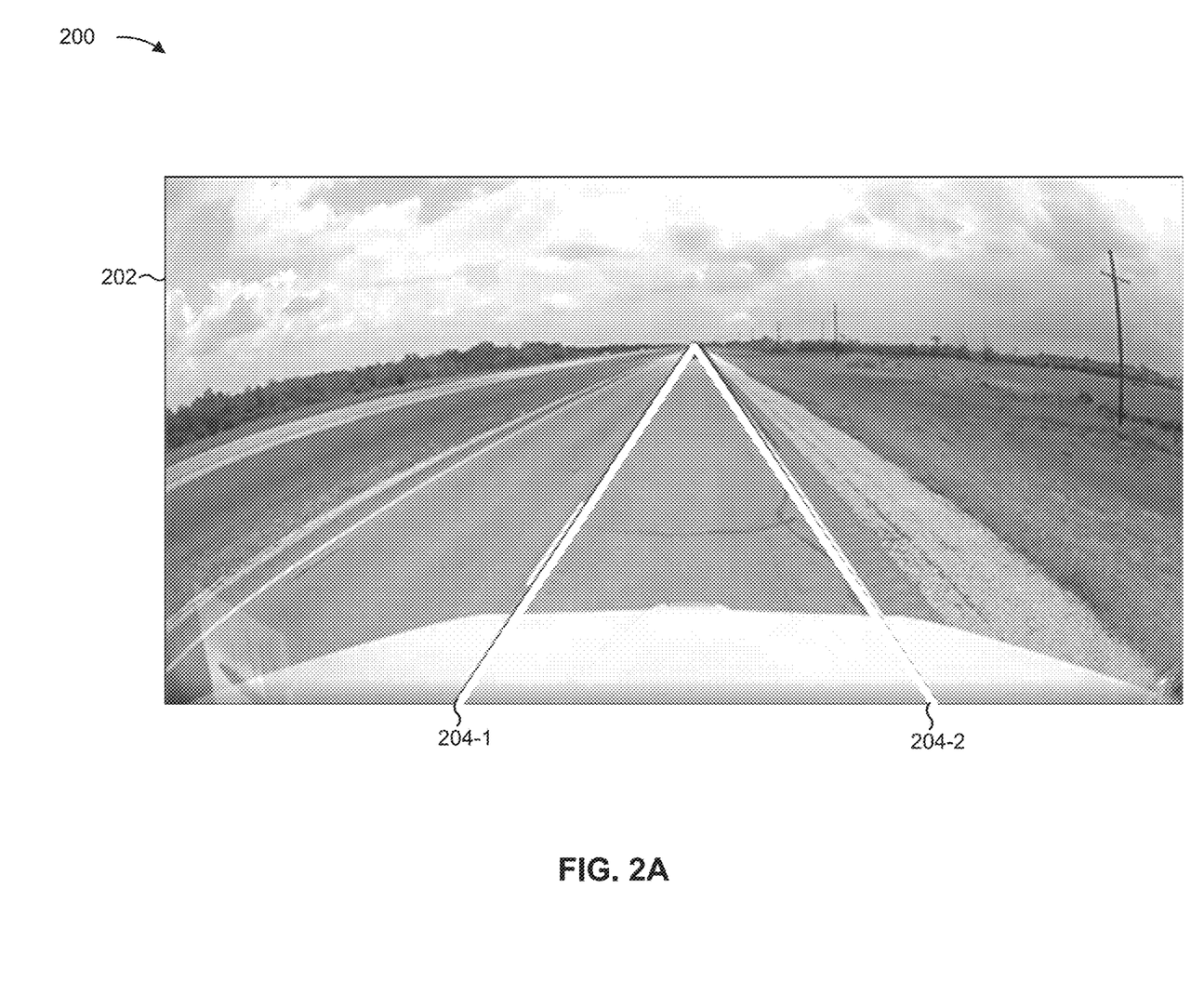
FIGS. 2A-2B are diagrams of an example associated with detecting a driving area in a video.
Figure 2B:
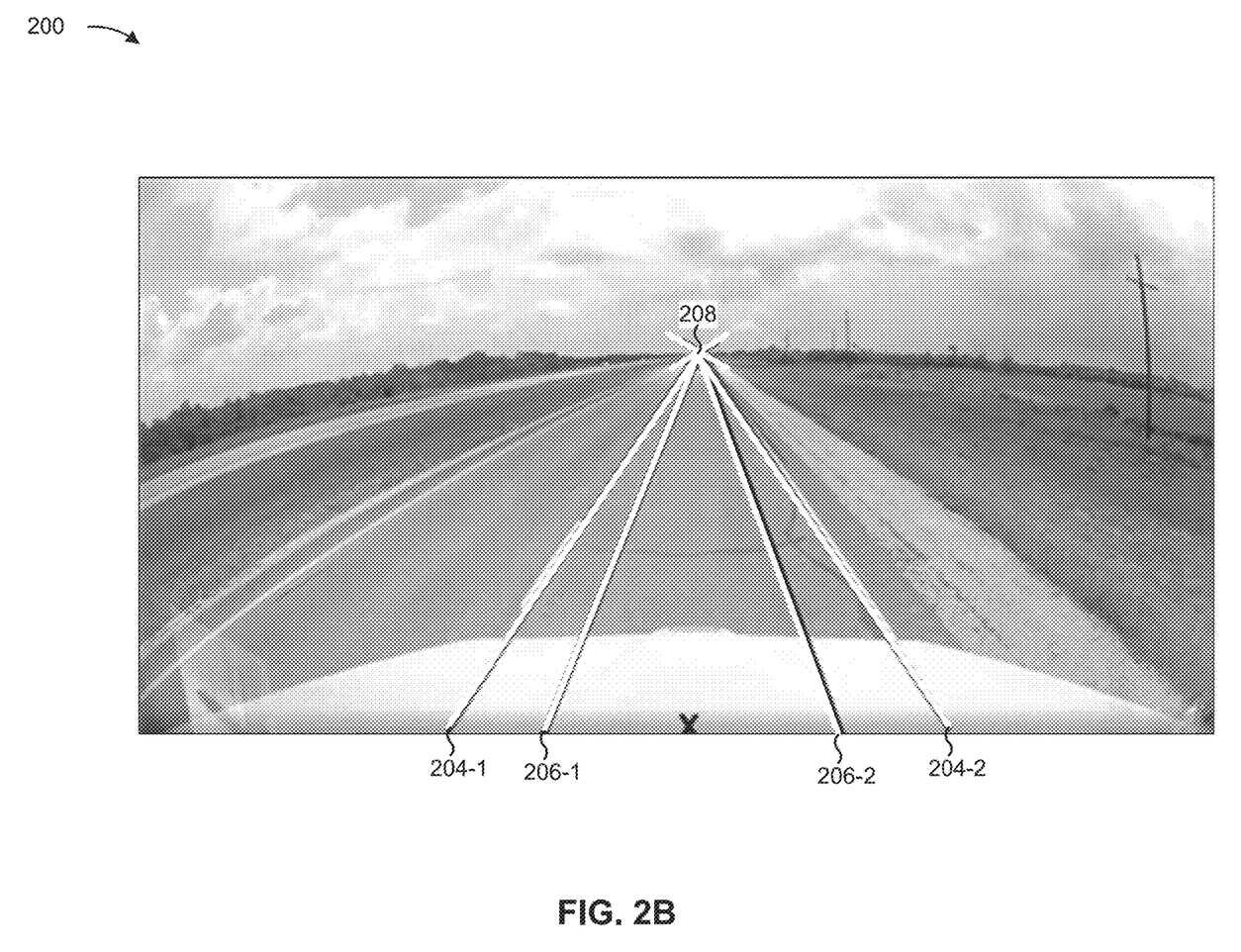

FIGS. 2A-2B are diagrams of an example 200 associated with detecting a driving area in a video. The example 200 may be associated with a method performed by a video system, such as a video system including or associated with one or more devices described below in connection with FIGS. 3-4.

In some implementations, a driving cone may be estimated by the video system based on lane detection alone (e.g., without performing object detection). Such implementations may be employed when object detection algorithms are not available at the video system and/or when it may be desirable to not implement the object detection techniques described above during a calibration phase of the video system, such as for purposes of conserving power resources, computing resources, communication resources, or other resources.

FIG. 2A shows an example video frame 202, such as a video frame from a video captured by a dashcam or a similar type of camera mounted to a dashboard of an ego vehicle or otherwise integrated into the ego vehicle. In some implementations, the video frame 202 may be substantially similar to the video frame 102 described above in connection with FIGS. 1A-1C.

In some implementations, the video system may be configured to determine a width of the ego vehicle. For example, in a similar manner as described above in connection with FIG. 1C, the video system may be configured to determine the width of the ego vehicle based on vehicle data received, for example, via user input or the like. Additionally, or alternatively, the video system may be configured to determine the width of the ego vehicle based on a VIN or other identifier associated with the ego vehicle, and/or based on sensor data from one or more sensors associated with the vehicle (e.g., GNSS sensor data or similar sensor data). For example, based on the VIN, other identifier, GNSS sensor data, or similar data, the video system may determine that the ego vehicle is associated with one of: a car class, which may be associated with a first average width (e.g., approximately 1.44 meters (m)); a bus class, which may be associated with a second average width (e.g., approximately 2.43 m); a truck class, which may be associated with a third average width (e.g., approximately 2.35 m); a light commercial vehicle (LCV) class, which may be associated with a fourth average width (e.g., approximately 2.10 m); a heavy-duty truck class, which may be associated with a fifth average width (e.g., approximately 2.50 m); and so forth. The average widths described above are provided for discussion purposes only, and, in some other implementations, the classes of vehicles and/or average widths thereof may vary.

Moreover, in some implementations, the video system may determine a width of a driving lane associated with the road on which the ego vehicle is traveling. For example, the video system may determine the width of the driving lane based on map data associated with a location of the ego vehicle. In such implementations, the video system may be preconfigured with, or may otherwise have access to, a database or similar data set indicating driving lane widths associated with various road types, such as highways, residential streets, or similar road types. In such implementations, based on GNSS sensor data (e.g., GPS data) or similar sensor data, the video system may determine a location of the ego vehicle and thus a type of road being traveled by the ego vehicle. The video system may in turn determine an average width of a driving lane associated with that particular road type, such as by cross-referencing the road type in the database or similar data set. In some other implementations, the video device may determine the road type using machine learning, such as by implementing one or more of the object detection techniques described above to determine the road type from the representation of the road and/or surrounding environment in one or more video frames 202 (e.g., by recognizing street markings, signs, or similar objects indicative of the road type).

In some implementations, the video system may detect a driving lane associated with the road in the video frame 202, such as by recognizing lane lines 204 or other lane boundaries within the video frame 202. For example, the video system may recognize a left lane line 204-1 and a right lane line 204-2, which may be substantially similar to the left lane line 104-1 and the right lane line 104-2 described above in connection with FIG. 1A. In that regard, the video system may detect the driving lane in a substantially similar manner as described above in connection with FIG. 1A. More particularly, the video system may use a lane detection algorithm, such as a traditional computer vision algorithm, an edge detection operator, a feature extraction technique, or a similar process, to recognize the lane lines 204 within the video frame 202. For example, the video system uses one or more of a Canny edge detector, a Hough transform, or a similar technique to recognize the lane lines 204 within the video frame 202. Additionally, or alternatively, the video system may implement a machine learning and/or a deep learning based approach to identify the lane lines 204 in the video frame 202, such as by using one or more of a CLRNet technique, a CondLaneNet technique, or a similar technique.

As shown in FIG. 2B, the video system may be configured to determine a region in the video corresponding to an area to be driven by the ego vehicle (e.g., a driving cone) based on the width of the ego vehicle and the width of the driving lane. More particularly, the video system may be configured to determine two driving cone lines 206 that bound a region in the video corresponding to the area to be driven by the ego vehicle (e.g., the driving cone), including a first driving cone line 206-1 and a second driving cone line 206-2. In some implementations, the video system may be configured to determine a vanishing point 208 associated with the driving lane. In such implementations, determining the region in the video corresponding to the area to be driven by the ego vehicle (e.g., determining the driving cone) may be further based on the vanishing point 208.

More particularly, the video system may detect the driving lane and/or determine the two intersecting lane lines 204-1, 204-2 that correspond to the edges of the driving lane, as described above in connection with FIG. 2A. The video system may further determine that a point at which the lines intersect corresponds to the vanishing point 208. The video system may further be configured to use the two intersecting lane lines 204-1, 204-2, the estimated lane width, the estimated ego vehicle width, and/or the vanishing point 208 the to estimate the width of the driving cone of the ego vehicle. For example, if the determined ego vehicle width is 2.5 m and the determined lane width is 3.7 m, the video system may determine that the driving cone's width should be approximately 67% of the width of the driving lane (e.g., 2.5 m/3.7 m). More generally, the video system may calculate a width of the driving cone in the video frame 202 as a portion of the width of the driving lane that is proportional to a ratio of the width of the ego vehicle to a width of the driving lane. Returning to the example in which the width of the ego vehicle is 67% of the width of the driving lane, the video system may determine the driving cone by centering the pair of driving cone lines 206, which are separated by approximately 67% of the width of the driving lane (e.g., approximately 67% of the horizontal distance between the left lane line 204-1 and the right lane line 204-2 at a given vertical location, such as the bottom of the video frame 202), within the detected driving lane (e.g., within the region bounded by the left lane line 204-1 and the right lane line 204-2) and/or by intersecting the two driving cone lines 206 at the vanishing point 208. The resulting driving cone may be determined to be the triangular region in the video frame 202 bounded by the bottom of the video frame 202 or the hood of the vehicle, the first driving cone line 206-1, and the second driving cone line 206-2.

The above-described processes may improve an accuracy of estimating a driving cone and/or may be suitable for various dashcam installations and vehicle classes. Accordingly, the processes may result in more robust ADASs, autonomous driving systems, video fleet management systems, vehicle safety systems, lane departure warning systems, or similar systems, and/or reduced power, computing, and communication resource consumption that would otherwise be required to calibrate video systems and/or identify and correct errors associated with video systems.

As indicated above, FIGS. 2A-2B are provided as an example. Other examples may differ from what is described with regard to FIGS. 2A-2B.

Figure 3:
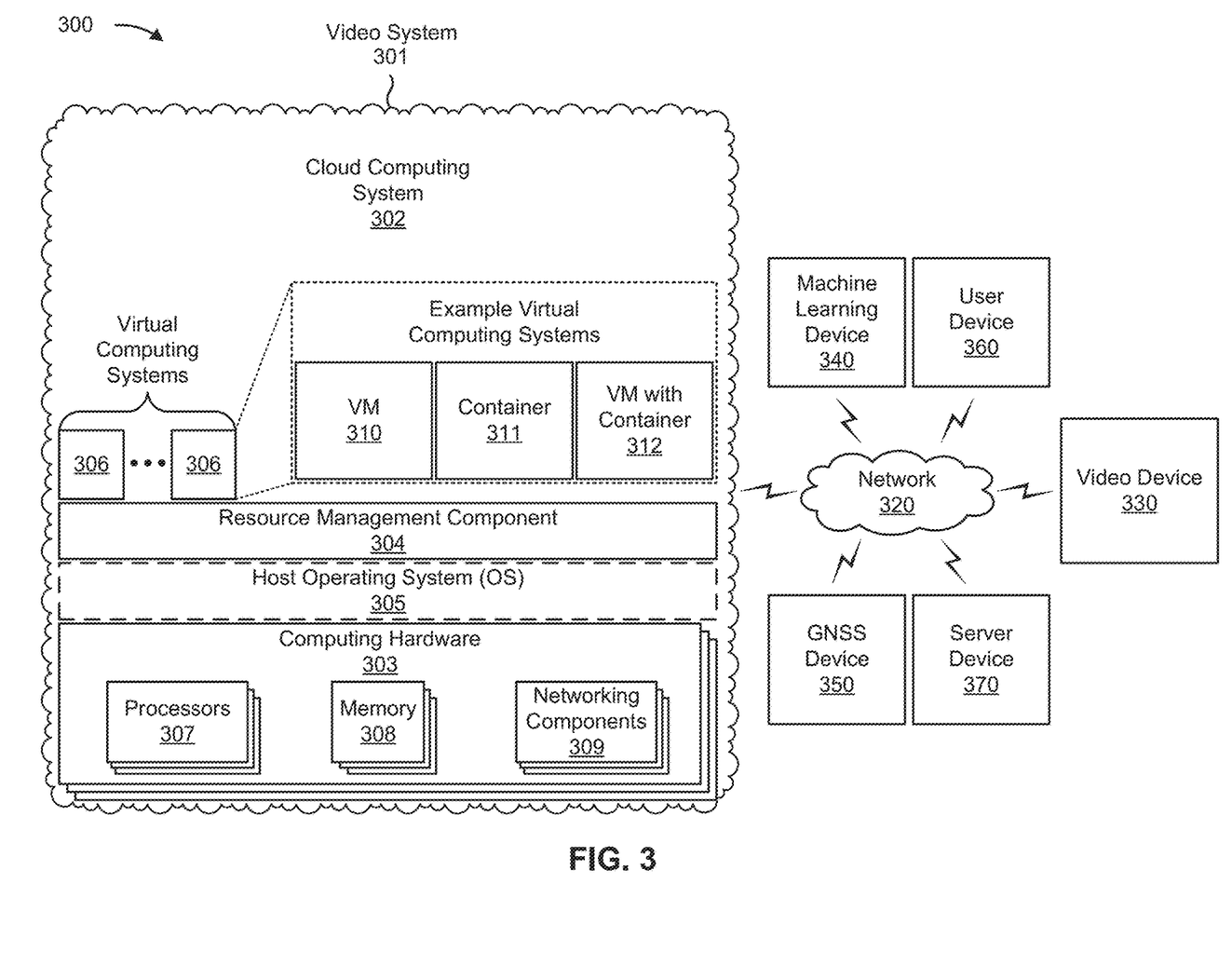
FIG. 3 is a diagram of an example environment in which systems and/or methods described herein may be implemented.

FIG. 3 is a diagram of an example environment 300 in which systems and/or methods described herein may be implemented. As shown in FIG. 3, environment 300 may include a video system 301, which may include one or more elements of and/or may execute within a cloud computing system 302. The cloud computing system 302 may include one or more elements 303-312, as described in more detail below. As further shown in FIG. 3, environment 300 may include a network 320, a video device 330, a machine learning device 340, a GNSS device 350, a user device 360, and/or a server device 370. Devices and/or elements of environment 300 may interconnect via wired connections and/or wireless connections.

The cloud computing system 302 may include computing hardware 303, a resource management component 304, a host operating system (OS) 305, and/or one or more virtual computing systems 306. The cloud computing system 302 may execute on, for example, an Amazon Web Services platform, a Microsoft Azure platform, or a Google Cloud platform. The resource management component 304 may perform virtualization (e.g., abstraction) of computing hardware 303 to create the one or more virtual computing systems 306. Using virtualization, the resource management component 304 enables a single computing device (e.g., a computer or a server) to operate like multiple computing devices, such as by creating multiple isolated virtual computing systems 306 from computing hardware 303 of the single computing device. In this way, computing hardware 303 can operate more efficiently, with lower power consumption, higher reliability, higher availability, higher utilization, greater flexibility, and lower cost than using separate computing devices.

The computing hardware 303 may include hardware and corresponding resources from one or more computing devices. For example, computing hardware 303 may include hardware from a single computing device (e.g., a single server) or from multiple computing devices (e.g., multiple servers), such as multiple computing devices in one or more data centers. As shown, computing hardware 303 may include one or more processors 307, one or more memories 308, and/or one or more networking components 309. Examples of a processor, a memory, and a networking component (e.g., a communication component) are described elsewhere herein.

The resource management component 304 may include a virtualization application (e.g., executing on hardware, such as computing hardware 303) capable of virtualizing computing hardware 303 to start, stop, and/or manage one or more virtual computing systems 306. For example, the resource management component 304 may include a hypervisor (e.g., a bare-metal or Type 1 hypervisor, a hosted or Type 2 hypervisor, or another type of hypervisor) or a virtual machine monitor, such as when the virtual computing systems 306 are virtual machines 310. Additionally, or alternatively, the resource management component 304 may include a container manager, such as when the virtual computing systems 306 are containers 311. In some implementations, the resource management component 304 executes within and/or in coordination with a host operating system 305.

A virtual computing system 306 may include a virtual environment that enables cloud-based execution of operations and/or processes described herein using computing hardware 303. As shown, a virtual computing system 306 may include a virtual machine 310, a container 311, or a hybrid environment 312 that includes a virtual machine and a container, among other examples. A virtual computing system 306 may execute one or more applications using a file system that includes binary files, software libraries, and/or other resources required to execute applications on a guest operating system (e.g., within the virtual computing system 306) or the host operating system 305.

Although the video system 301 may include one or more elements 303-312 of the cloud computing system 302, may execute within the cloud computing system 302, and/or may be hosted within the cloud computing system 302, in some implementations, the video system 301 may not be cloud-based (e.g., may be implemented outside of a cloud computing system) or may be partially cloud-based. For example, the video system 301 may include one or more devices that are not part of the cloud computing system 302, such as device 400 of FIG. 4, which may include a stand-alone server or another type of computing device. The video system 301 may perform one or more operations and/or processes described in more detail elsewhere herein.

The network 320 may include one or more wired and/or wireless networks. For example, the network 320 may include a cellular network, a public land mobile network (PLMN), a local area network (LAN), a wide area network (WAN), a private network, the Internet, and/or a combination of these or other types of networks. The network 320 enables communication among the devices of the environment 300.

The video device 330 may include a dashcam, a camera, or a similar device configured to capture an image and/or a video (e.g., a recording of an image or of moving images) and/or capable of being mounted to a vehicle, such as to a dashboard of a vehicle. In some implementations, the video device may include, or form a portion of, an ADAS, an autonomous driving system, a video fleet management system, a vehicle safety system, a lane departure warning system, or a similar system.

The machine learning device 340 may include one or more devices configured to perform one or more deep learning algorithms, object detection algorithms, or similar machine learning algorithms. In some implementations, the machine learning device 340 may be capable of performing one or more of a CLRNet technique, a CondLaneNet technique, a YOLO technique, a Faster R-CNN technique, an EfficientDet technique, an RNN technique, a RANSAC technique, or a similar technique.

The GNSS device 350 may include one or more devices configured to communicate with a GNSS system, such as a GPS system or similar system. In some implementations, the GNSS device 350 may be capable of determining a location of the video device 330, such as by communicating with a GNSS, and/or may be capable of determining a type of road that a vehicle associated with the video device 330 is traveling on. Additionally, or alternatively, the GNSS device 350 may be capable of detecting a class of vehicle associated with a video device, such as by determining multiple GNSS data sets and/or vectors associated with the video device 330 as input to an RNN technique or similar method used to determine the class of vehicle. In some implementations, the GNSS device 350 may include or may be associated with a vehicle classification system capable of detecting a class of vehicle associated with a video device via GNSS data or similar data.

The user device 360 may include one or more devices configured to receive, generate, store, process, and/or provide information associated with a vehicle. For example, user device 360 may include a mobile phone (e.g., a smart phone), a laptop computer, a tablet computer, a gaming device, a wearable communication device (e.g., a smart wristwatch or a pair of smart eyeglasses), a navigation device (e.g., a GNSS and/or GPS navigation device), one or more sensors capable of capturing information relating to the vehicle, and/or a similar type of device. In some implementations, user device 360 may be associated with an autonomous vehicle.

The server device 370 may include one or more devices configured to receive, generate, store, process, and/or provide information associated with a vehicle. For example, the server device 370 may include a server (e.g., in a data center or a cloud computing environment), a data center (e.g., a multi-server micro data center), a workstation computer, a virtual machine (VM) provided in a cloud computing environment, or a similar type of device. In some implementations, the server device 370 may provide, to the video device 330 or other device associated with the video system 301, information related to a vehicle. Additionally, or alternatively, server device 370 may store information related to a vehicle (e.g., to facilitate analysis of the information).

The number and arrangement of devices and networks shown in FIG. 3 are provided as an example. In practice, there may be additional devices and/or networks, fewer devices and/or networks, different devices and/or networks, or differently arranged devices and/or networks than those shown in FIG. 3. Furthermore, two or more devices shown in FIG. 3 maybe implemented within a single device, or a single device shown in FIG. 3 maybe implemented as multiple, distributed devices. Additionally, or alternatively, a set of devices (e.g., one or more devices) of the environment 300 may perform one or more functions described as being performed by another set of devices of the environment 300.

Figure 4:
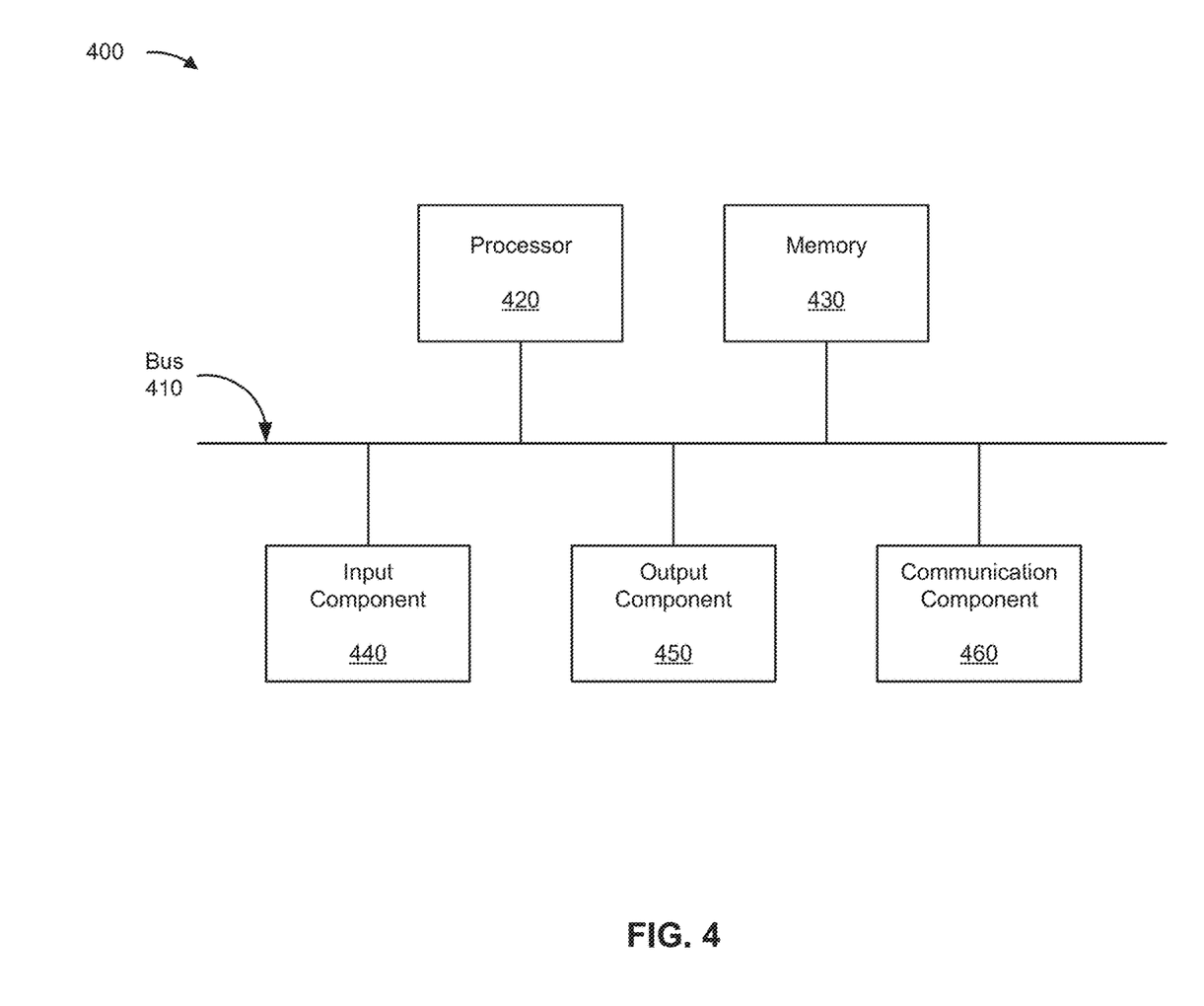
FIG. 4 is a diagram of example components of a device associated with detecting a driving area in a video.

FIG. 4 is a diagram of example components of a device 400 associated with detecting a driving area in a video. The device 400 may correspond to the video system 301, the cloud computing system 302, the video device 330, the machine learning device 340, the GNSS device 350, the user device 360, and/or the server device 370. In some implementations, the video system 301, the cloud computing system 302, the video device 330, the machine learning device 340, the GNSS device 350, the user device 360, and/or the server device 370 may include one or more devices 400 and/or one or more components of the device 400. As shown in FIG. 4, the device 400 may include a bus 410, a processor 420, a memory 430, an input component 440, an output component 450, and/or a communication component 460.

The bus 410 may include one or more components that enable wired and/or wireless communication among the components of the device 400. The bus 410 may couple together two or more components of FIG. 4, such as via operative coupling, communicative coupling, electronic coupling, and/or electric coupling. For example, the bus 410 may include an electrical connection (e.g., a wire, a trace, and/or a lead) and/or a wireless bus. The processor 420 may include a central processing unit, a graphics processing unit, a microprocessor, a controller, a microcontroller, a digital signal processor, a field-programmable gate array, an application-specific integrated circuit, and/or another type of processing component. The processor 420 may be implemented in hardware, firmware, or a combination of hardware and software. In some implementations, the processor 420 may include one or more processors capable of being programmed to perform one or more operations or processes described elsewhere herein.

The memory 430 may include volatile and/or nonvolatile memory. For example, the memory 430 may include random access memory (RAM), read only memory (ROM), a hard disk drive, and/or another type of memory (e.g., a flash memory, a magnetic memory, and/or an optical memory). The memory 430 may include internal memory (e.g., RAM, ROM, or a hard disk drive) and/or removable memory (e.g., removable via a universal serial bus connection). The memory 430 may be a non-transitory computer-readable medium. The memory 430 may store information, one or more instructions, and/or software (e.g., one or more software applications) related to the operation of the device 400. In some implementations, the memory 430 may include one or more memories that are coupled (e.g., communicatively coupled) to one or more processors (e.g., processor 420), such as via the bus 410. Communicative coupling between a processor 420 and a memory 430 may enable the processor 420 to read and/or process information stored in the memory 430 and/or to store information in the memory 430.

The input component 440 may enable the device 400 to receive input, such as user input and/or sensed input. For example, the input component 440 may include a touch screen, a keyboard, a keypad, a mouse, a button, a microphone, a switch, a sensor, a global positioning system sensor, an accelerometer, a gyroscope, and/or an actuator. The output component 450 may enable the device 400 to provide output, such as via a display, a speaker, and/or a light-emitting diode. The communication component 460 may enable the device 400 to communicate with other devices via a wired connection and/or a wireless connection. For example, the communication component 460 may include a receiver, a transmitter, a transceiver, a modem, a network interface card, and/or an antenna.

The device 400 may perform one or more operations or processes described herein. For example, a non-transitory computer-readable medium (e.g., memory 430) may store a set of instructions (e.g., one or more instructions or code) for execution by the processor 420. The processor 420 may execute the set of instructions to perform one or more operations or processes described herein. In some implementations, execution of the set of instructions, by one or more processors 420, causes the one or more processors 420 and/or the device 400 to perform one or more operations or processes described herein. In some implementations, hardwired circuitry may be used instead of or in combination with the instructions to perform one or more operations or processes described herein. Additionally, or alternatively, the processor 420 may be configured to perform one or more operations or processes described herein. Thus, implementations described herein are not limited to any specific combination of hardware circuitry and software.

The number and arrangement of components shown in FIG. 4 are provided as an example. The device 400 may include additional components, fewer components, different components, or differently arranged components than those shown in FIG. 4. Additionally, or alternatively, a set of components (e.g., one or more components) of the device 400 may perform one or more functions described as being performed by another set of components of the device 400.

Figure 5:
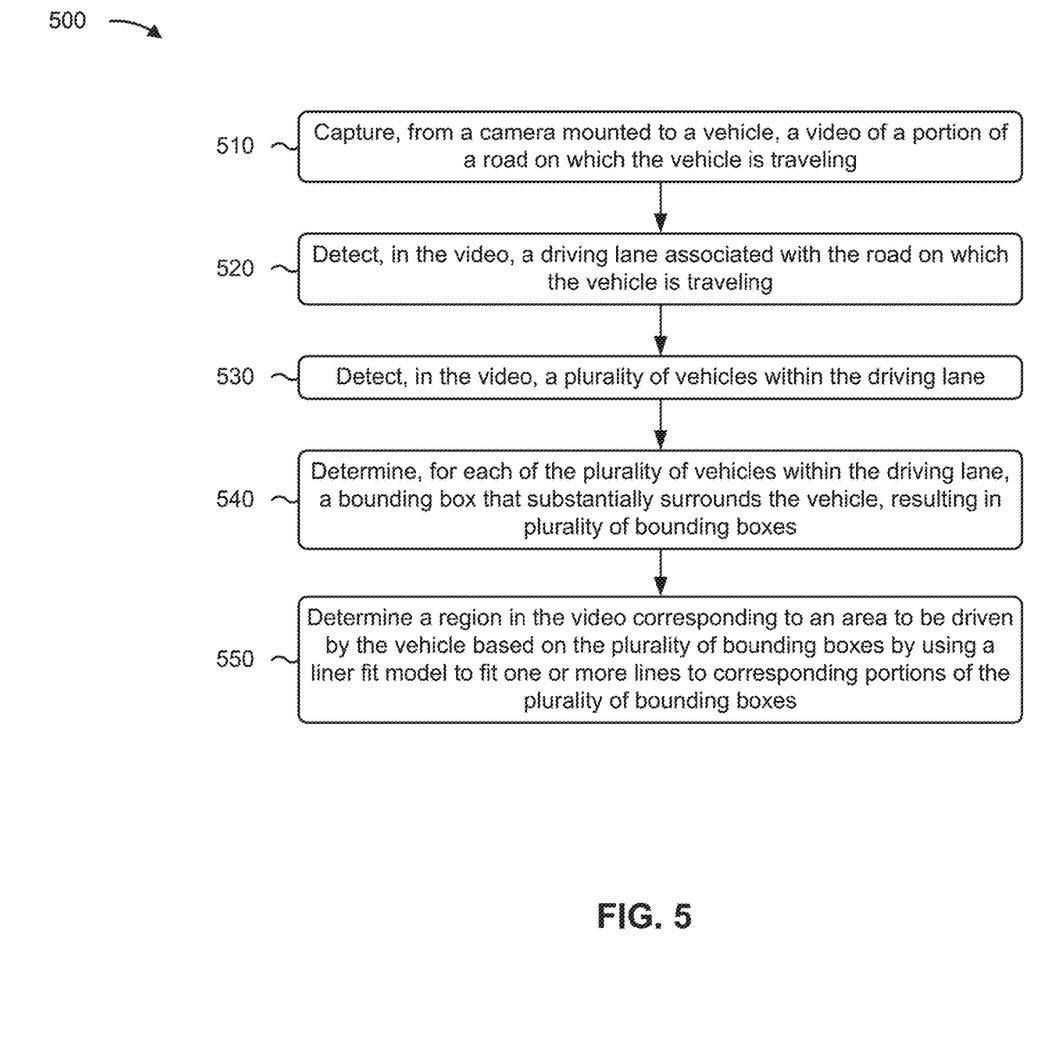
FIG. 5 is a flowchart of an example process associated with detecting a driving area in a video.

FIG. 5 is a flowchart of an example process 500 associated with detecting a driving area in a video. In some implementations, one or more process blocks of FIG. 5 maybe performed by a video system (e.g., video system 301). In some implementations, one or more process blocks of FIG. 5 maybe performed by another device or a group of devices separate from or including the video system, such as a cloud computing environment (e.g., cloud computing system 302), a video device (e.g., the video device 330), a machine learning device (e.g., machine learning device 340), a GNSS device (e.g., GNSS device 350), a user device (e.g., user device 360), and/or a server device (e.g., the server device 370). Additionally, or alternatively, one or more process blocks of FIG. 5 maybe performed by one or more components of device 400, such as processor 420, memory 430, input component 440, output component 450, and/or communication component 460.

As shown in FIG. 5, process 500 may include capturing, from a camera mounted to a vehicle, a video of a portion of a road on which the vehicle is traveling (block 510). For example, the video system may capture, from a camera mounted to a vehicle, a video of a portion of a road on which the vehicle is traveling, as described above.

As further shown in FIG. 5, process 500 may include detecting, in the video, a driving lane associated with the road on which the vehicle is traveling (block 520). For example, the video system may detect, in the video, a driving lane associated with the road on which the vehicle is traveling, as described above.

As further shown in FIG. 5, process 500 may include detecting, in the video, a plurality of other vehicles within the driving lane (block 530). For example, the video system may detect, in the video, the plurality of other vehicles within the driving lane, as described above. In some implementations, at least one of detecting the driving lane associated with the road on which the vehicle is traveling or detecting the plurality of other vehicles within the driving lane is performed using at least one of a deep learning model or a computer vision algorithm. Moreover, each of the plurality of other vehicles within the driving lane may be associated with a same class of vehicles, and/or the plurality of other vehicles may include a threshold number of other vehicles.

As further shown in FIG. 5, process 500 may include determining, for each of the plurality of other vehicles within the driving lane, a bounding box that substantially surrounds an image of the other vehicle, resulting in a plurality of bounding boxes (block 540). For example, the video system may determine, for each of the multiple other vehicles within the driving lane, a bounding box that substantially surrounds an image of the other vehicle, resulting in a plurality of bounding boxes, as described above.

As further shown in FIG. 5, process 500 may include determining a region in the video corresponding to an area to be driven by the vehicle based on the plurality of bounding boxes by using a linear fit model to fit one or more lines to corresponding portions of the plurality of bounding boxes (block 550). For example, the video system may determine a region in the video corresponding to an area to be driven by the vehicle based on the plurality of bounding boxes by using a linear fit model to fit one or more lines to corresponding portions of the plurality of bounding boxes, as described above. In some implementations, process 500 includes determining a class of the vehicle, wherein determining the region in the video corresponding to the area to be driven by the vehicle is further based on the class of the vehicle. Additionally, or alternatively, in some implementations, determining the region in the video corresponding to the area to be driven by the vehicle based on the plurality of bounding boxes includes using the linear fit model to determine a first line that fits to first corners of the plurality of bounding boxes and a second line that fits to second corners of the plurality of bounding boxes. Moreover, process 500 may include determining an angular speed of the vehicle, wherein determining the region in the video corresponding to the area to be driven by the vehicle is further based on the angular speed of the vehicle.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
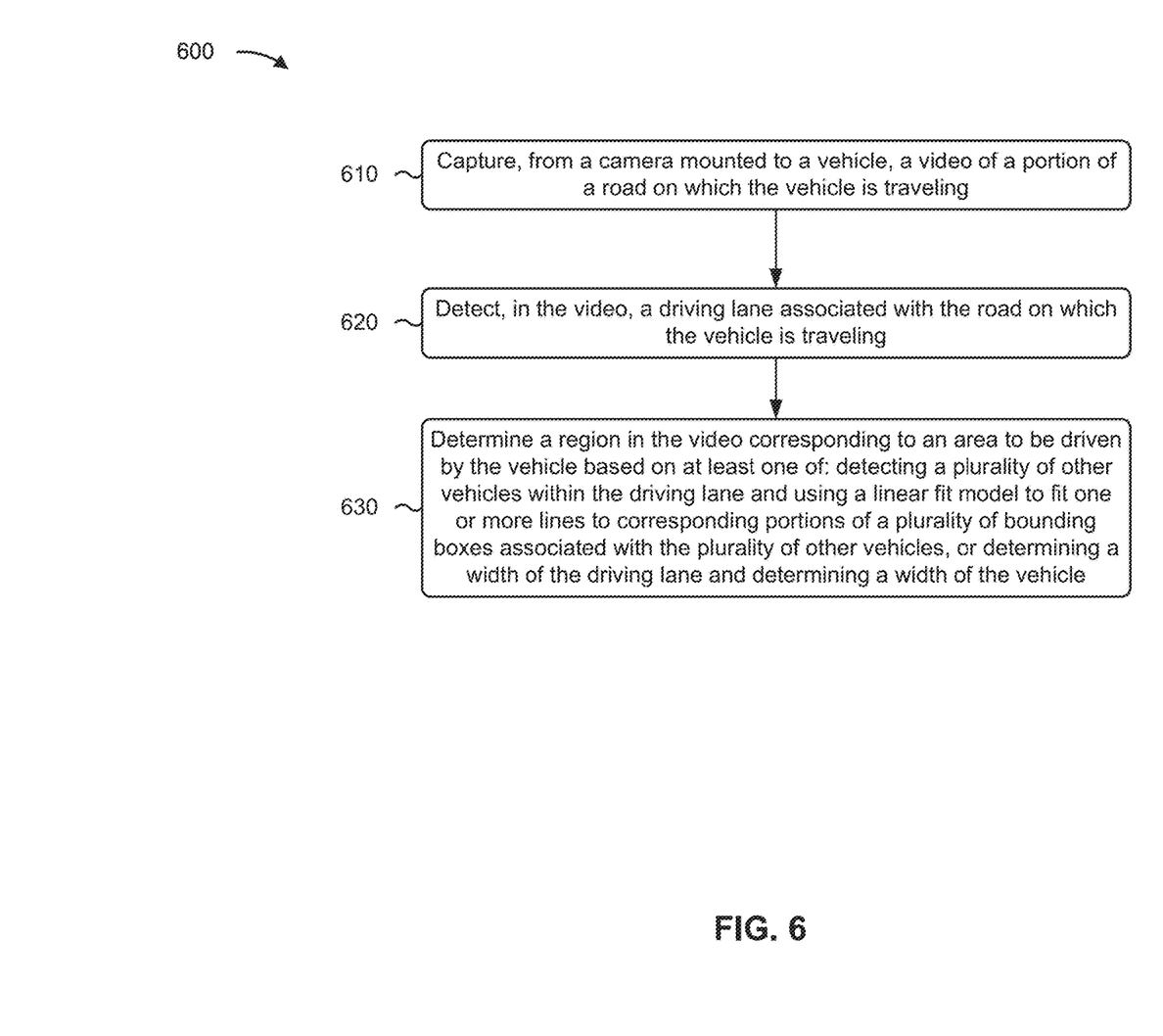
FIG. 6 is a flowchart of an example process associated with detecting a driving area in a video.

FIG. 6 is a flowchart of an example process 600 associated with detecting a driving area in a video. In some implementations, one or more process blocks of FIG. 6 maybe performed by a video system (e.g., video system 301). In some implementations, one or more process blocks of FIG. 6 maybe performed by another device or a group of devices separate from or including the video system, such as a cloud computing environment (e.g., cloud computing system 302), a video device (e.g., the video device 330), a machine learning device (e.g., machine learning device 340), a GNSS device (e.g., GNSS device 350), a user device (e.g., user device 360), and/or a server device (e.g., the server device 370). Additionally, or alternatively, one or more process blocks of FIG. 6 maybe performed by one or more components of device 400, such as processor 420, memory 430, input component 440, output component 450, and/or communication component 460.

As shown in FIG. 6, process 600 may include capturing, from a camera mounted to a vehicle, a video of a portion of a road on which the vehicle is traveling (block 610). For example, the video system may capture, from a camera mounted to a vehicle, a video of a portion of a road on which the vehicle is traveling, as described above.

As further shown in FIG. 6, process 600 may include detecting, in the video, a driving lane associated with the road on which the vehicle is traveling (block 620). For example, the video system may detect, in the video, a driving lane associated with the road on which the vehicle is traveling, as described above. In some implementations, detecting the driving lane associated with the road on which the vehicle is traveling is performed using at least one of a deep learning model or a computer vision algorithm.

As further shown in FIG. 6, process 600 may include determining a region in the video corresponding to an area to be driven by the vehicle based on at least one of: detecting a plurality of other vehicles within the driving lane and using a linear fit model to fit one or more lines to corresponding portions of a plurality of bounding boxes associated with the plurality of other vehicles, or determining a width of the driving lane and determining a width of the vehicle (block 630). For example, the video system may determine a region in the video corresponding to an area to be driven by the vehicle based on at least one of: detecting a plurality of other vehicles within the driving lane and using a linear fit model to fit one or more lines to corresponding portions of a plurality of bounding boxes associated with the plurality of other vehicles, or determining a width of the driving lane and determining a width of the vehicle. In some implementations, process 600 includes determining a vanishing point associated with the driving lane, wherein determining the region in the video corresponding to the area to be driven by the vehicle is further based on the vanishing point.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code-it being understood that software and hardware can be used to implement the systems and/or methods based on the description herein.

As used herein, satisfying a threshold may depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
   capturing, from a camera mounted to a vehicle, a video of a portion of a road on which the vehicle is traveling;
   detecting, in the video, a driving lane associated with the road on which the vehicle is traveling;
   detecting, in the video, a plurality of other vehicles within the driving lane;
   determining, for each of the plurality of other vehicles within the driving lane, a bounding box that substantially surrounds an image of the other vehicle, resulting in a plurality of bounding boxes; and
   determining a region in the video corresponding to an area to be driven by the vehicle based on the plurality of bounding boxes by using a linear fit model to a first line to first corners of the plurality of bounding boxes and a second line to second corners of the plurality of bounding boxes.

2. The method of claim 1, wherein at least one of detecting the driving lane associated with the road on which the vehicle is traveling or detecting the plurality of other vehicles within the driving lane is performed using at least one of a deep learning model or a computer vision algorithm.

3. The method of claim 1, further comprising determining a class of the vehicle, wherein determining the region in the video corresponding to the area to be driven by the vehicle is further based on the class of the vehicle.

4. The method of claim 1, wherein each of the plurality of other vehicles within the driving lane are associated with a same class of vehicles.

5. The method of claim 1, wherein the plurality of other vehicles includes a threshold number of other vehicles.

6. The method of claim 1, further comprising determining an angular speed of the vehicle, wherein determining the region in the video corresponding to the area to be driven by the vehicle is further based on the angular speed of the vehicle.

7. The method of claim 1, wherein determining the region in the video corresponding to the area to be driven by the vehicle is further based on determining a width of the driving lane.

8. The method of claim 1, wherein determining the region in the video corresponding to the area to be driven by the vehicle is further based on determining a width of the vehicle.

9. A method, comprising:
   capturing, from a camera mounted to a vehicle, a video of a portion of a road on which the vehicle is traveling;
   detecting, in the video, a driving lane associated with the road on which the vehicle is traveling; and
   determining a region in the video corresponding to an area to be driven by the vehicle based on:
      detecting a plurality of other vehicles within the driving lane and using a linear fit model to fit a first line to corresponding first corners of a plurality of bounding boxes associated with the plurality of other vehicles and a second line to second corners of the plurality of bounding boxes.

10. The method of claim 9, further comprising determining a width of the vehicle, wherein the width of the vehicle is determined based on at least one of a vehicle identification number associated with the vehicle or sensor data from one or more sensors associated with the vehicle.

11. The method of claim 9, further comprising determining a width of the driving lane, wherein the width of the driving lane is determined based on one of map data associated with a location of the vehicle or detecting a road type based on the video.

12. The method of claim 9, wherein detecting the driving lane associated with the road on which the vehicle is traveling is performed using at least one of a deep learning model or a computer vision algorithm.

13. The method of claim 9, further comprising determining a vanishing point associated with the driving lane, wherein determining the region in the video corresponding to the area to be driven by the vehicle is further based on the vanishing point.

14. A video system, comprising:
one or more processors configured to:
- capture, from a camera mounted to a vehicle, a video of a portion of a road on which the vehicle is traveling;
- detect, in the video, a driving lane associated with the road on which the vehicle is traveling; and
- determine a region in the video corresponding to an area to be driven by the vehicle based on detecting a plurality of other vehicles within the driving lane, determining a bounding box that substantially surrounds an image of each of the plurality of other vehicles, and using a linear fit model to fit a first line to first corners of the plurality of bounding boxes and a second line to second corners of the plurality of bounding boxes.

15. The video system of claim 14, wherein the one or more processors are configured to detect at least one of the driving lane associated with the road on which the vehicle is traveling or the plurality of other vehicles within the driving lane using at least one of a deep learning model or a computer vision algorithm.

16. The video system of claim 14, wherein the one or more processors are further configured to:
- determine a class of the vehicle; and
- determine the region in the video corresponding to the area to be driven by the vehicle further based on the class of the vehicle.

17. The video system of claim 14, wherein the one or more processors are further configured to determine the region in the video corresponding to the area to be driven by the vehicle based on detecting a threshold number of other vehicles within the driving lane.

18. The video system of claim 14, wherein the one or more processors are further configured to determine an angular speed of the vehicle, wherein the one or more processors are configured to determine the region in the video corresponding to the area to be driven by the vehicle further based on the angular speed of the vehicle.

19. The video system of claim 14, wherein the one or more processors are further configured to determine a width of the vehicle, wherein the width of the vehicle is determined based on at least one of a vehicle identification number associated with the vehicle or sensor data from one or more sensors associated with the vehicle.

20. The video system of claim 14, wherein the one or more processors are further configured to determine a width of the driving lane, wherein the width of the driving lane is determined based on one of map data associated with a location of the vehicle or detecting a road type based on the video.

* * * * *